Feb. 17, 1953     E. F. MITAN     2,628,518
SPRING LUBRICATING APPARATUS
Filed Jan. 14, 1949
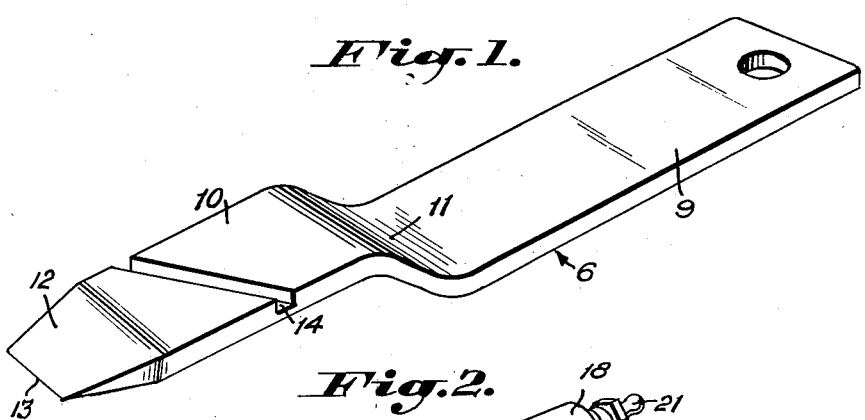
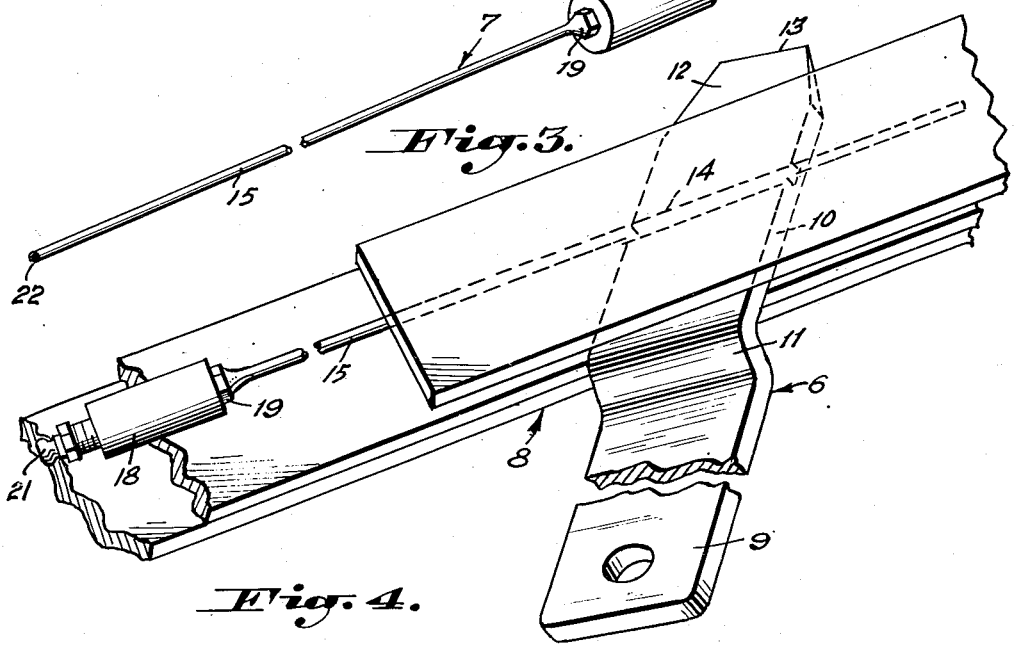
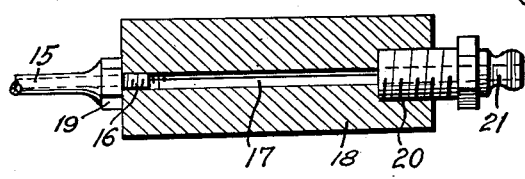
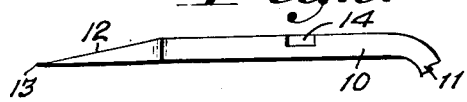
Inventor
Edwart Frank Mitan
John N. Randolph
Attorney Patented Feb. 17, 1953

2,628,518

UNITED STATES PATENT OFFICE 2,628,518

SPRING LUBRICATING APPARATUS

Edwart Frank Mitan, Bellaire, Ohio

Application January 14, 1949, Serial No. 70,887

2 Claims. (Cl. 81—3.7)

This invention relates to an apparatus for lubricating leaf springs of motor vehicles and has for its primary object to provide a spreading tool capable of being inserted between the leaves of a spring for spreading the leaves and for receiving a pipe or conduit through which a lubricant such as oil or light grease can be discharged onto the inner faces of the spring leaves.

It is a primary object of the present invention to provide an apparatus which may be quickly and easily operated to efficiently lubricate and supply a lubricant to the abutting faces of spring leaves for use in lieu of the ineffective method now commonly employed of applying oil to the side edges of a leaf spring with a brush and with the hope that some of the oil thus applied will penetrate between the leaves of the spring.

Another object of the invention is to provide a lubricating apparatus of extremely simple construction which is capable of being economically manufactured and sold and which can be quickly and efficiently utilized for properly lubricating the abutting faces of the leaves of a spring.

Various other objects and advantages of the invention will hereinafter become more fully apparent from the following description of the drawing, illustrating a preferred embodiment thereof, and wherein:

Figure 1 is a perspective view showing a tool, forming a part of the apparatus for use in spreading the leaves of a spring;

Figure 2 is a similar view of a pipe or conduit for use with the tool of Figure 1 for applying a lubricant to the spring and between the leaves thereof;

Figure 3 is a perspective view showing the apparatus in an applied position;

Figure 4 is an enlarged longitudinal sectional view, partly in side elevation of one end of the conduit and which is adapted for attachment to a high-pressure grease gun, and Figure 5 is a fragmentary side elevational view of the blade portion of the tool of Figure 1.

Referring more specifically to the drawing, the lubricating apparatus in its entirety includes a spring spreading tool, designated generally 6 and a pipe or conduit, designated generally 7 for use with the tool 6 for supplying a lubricant to the space between the leaves of a spring 8 which are spread by the blade of the tool 6, as illustrated in Figure 3.

The tool 6 comprises a relatively wide and heavy bar of metal which is rigid and which includes an elongated shank portion 9 constituting one end thereof and a blade 10 which constitutes the opposite end of the bar forming the tool 6 and which is upwardly offset with respect to the bar 9 by an inclined portion 11 of said bar. The free end of the blade 10 is beveled on its upper side and preferably along its side edges to provide a ramp or cam surface 12 and a leading feather edge 13. The upper surface of the blade 10 is provided with a groove or channel 14 which extends diagonally thereacross.

The pipe or conduit, designated generally 7, includes an elongated tube 15 of relatively small internal and external diameter which is capable of being bent or flexed without breaking and which is provided with a threaded end 16, as seen in Figure 4, which is adapted to be threaded into the threaded end of a bore 17 of a shorter conduit 18 which is relatively large in diameter in comparison to the diameter of its bore. A jam nut 19 engages the externally threaded end 16 of the tube 15 and is adapted to abut against an end of the conduit 18 for adjustably retaining the tube 15 applied thereto. The opposite end of the bore 17 is enlarged and internally threaded to provide a threaded recess 20 to receive a conventional fitting 21 of the type which is adapted to be attached to a high-pressure grease gun, not shown.

To utilize the apparatus 6, 7 for lubricating the leaves of the spring 8, the leading edge 13 of the blade 10 is forced between two of the leaves of the spring 8 and so that the ramp portion 12 thereof will displace the uppermost of said two leaves upwardly to permit the blade 10 to move therebetween. The blade 10 is forced transversely between the spring leaves until further advancement is stopped by the engagement of the portion 11 with the lowermost of said leaves. The tool 6 is then swung slightly to position the channel or groove 14 in the upper side of the blade substantially longitudinally of the spring 8 and with the tool portion 11 abutting a side edge of the leaf spring 8, the groove 14 will then be positioned substantially intermediate of the side edges of the spring. The tube 15 which may, if necessary, be bent for the purpose is then inserted between the spread leaves of the spring 8 through the groove 14 and longitudinally of the spring as far as possible in a direction toward the center of the spring. Assuming that the fitting 21 is attached to a high-pressure grease gun, not shown, it will be readily apparent that grease can then be supplied to the space between the spread spring leaves through the bore 17 and the bore of the tube 15 and as the lubricant is discharged from the discharge end 22 of the tube 15, said tube is gradually retracted from the spring and with the channel 14 functioning as a guide for the tube as it is withdrawn and in the same manner as it functions for applying the tube to the spring. It will thus be readily apparent that the grease or lubricant, not shown, will be applied centrally and longitudinally between the spread leaves of the spring so that the leaves will be thoroughly lubricated thereby when the blade 10 is withdrawn therefrom.

Various modifications and changes are contemplated and may obviously be resorted to, without departing from the spirit or scope of the invention as hereinafter defined by the appended claims.

I claim as my invention:

1. A lubricating apparatus for leaf springs comprising a leaf spreading tool including a relatively wide, relatively thick blade having a beveled free end adapted to be forced between the leaves of a spring for positioning said blade between two of the spring leaves, said blade having a groove extending transversely thereacross and adapted to be disposed substantially longitudinally of the spring, and a tube for supplying a lubricant under pressure extending slidably through said groove as a guide and supported therein for sliding movement longitudinally between the spread leaves of the spring, said tube supplying a lubricant to the space between said spring leaves as the discharge end of the tube is moved longitudinally of the spring.

2. A lubricating apparatus for leaf springs comprising a leaf spreading tool including a relatively wide, relatively thick blade having a beveled free end adapted to be forced between the leaves of a spring for positioning said blade between two of the spring leaves, said blade having a groove extending transversely thereacross and adapted to be disposed substantially longitudinally of the spring, and a tube for supplying a lubricant under pressure extending slidably through said groove and guided thereby for sliding movement longitudinally between said two spring leaves, said tube being supported by the bed of the groove for free sliding movement between said two spring leaves.

EDWART FRANK MITAN.

REFERENCES CITED

The following references are of record in the file of this patent:

UNITED STATES PATENTS

| Number | Name | Date |
|---|---|---|
| 96,700 | Howard | Nov. 9, 1869 |
| 1,412,743 | Herfjord | Apr. 11, 1922 |
| 1,419,210 | Bradford | June 13, 1922 |
| 1,469,308 | Kronenbitter | Oct. 2, 1923 |

FOREIGN PATENTS

| Number | Country | Date |
|---|---|---|
| 5,454 | Australia | Aug. 12, 1927 |
| 383,220 | Great Britain | Nov. 10, 1932 |